United States Patent
Chandrasekaran et al.

(10) Patent No.: US 12,271,762 B2
(45) Date of Patent: Apr. 8, 2025

(54) DATA CURATION WITH CAPACITY SCALING

(71) Applicant: SAP SE, Walldorf (DE)

(72) Inventors: Vengateswaran Chandrasekaran, Trichy (IN); Sriram Narasimhan, Pleasanton, CA (US); Panish Ramakrishna, Bangalore (IN); Vinay Santurkar, Santa Clara, CA (US); Venkatesh Iyengar, Bangalore (IN); Amit Joshi, Bengaluru (IN)

(73) Assignee: SAP SE, Walldorf (DE)

( * ) Notice: Subject to any disclaimer, the term of this patent is extended or adjusted under 35 U.S.C. 154(b) by 675 days.

(21) Appl. No.: 17/358,976

(22) Filed: Jun. 25, 2021

(65) Prior Publication Data
US 2022/0413939 A1 Dec. 29, 2022

(51) Int. Cl.
*G06F 9/50* (2006.01)
*G06F 9/54* (2006.01)
*G06N 20/00* (2019.01)

(52) U.S. Cl.
CPC ............ *G06F 9/5083* (2013.01); *G06F 9/542* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2013/0031563 A1* | 1/2013 | Skowron | ............... | G06F 3/0631 718/105 |
| 2018/0198729 A1* | 7/2018 | Cook | ..................... | H04L 47/76 |
| 2019/0235922 A1* | 8/2019 | Iovanna | ................. | G06F 9/5088 |
| 2020/0004600 A1* | 1/2020 | Acker | ..................... | H04L 67/10 |
| 2021/0311958 A1* | 10/2021 | Searle | ................... | G06F 16/254 |
| 2022/0103618 A1* | 3/2022 | Pinheiro | ................. | H04L 67/60 |
| 2022/0237506 A1* | 7/2022 | Feldman | ................. | G06F 9/445 |

OTHER PUBLICATIONS

Tokusashi, Yuta, Hiroki Matsutani, and Noa Zilberman. "Lake: An energy efficient, low latency, accelerated key-value store." arXiv preprint arXiv:1805.11344 (2018). (Year: 2018).*
Ramakrishnan et al., "Azure data lake store: a hyperscale distributed file service for big data analytics." In Proceedings of the 2017 ACM International Conference on Management of Data, pp. 51-63. 2017. (Year: 2017).*

* cited by examiner

*Primary Examiner* — Frank D Mills
(74) *Attorney, Agent, or Firm* — Mintz Levin Cohn Ferris Glovsky and Popeo, P.C.

(57) ABSTRACT

A method may include allocating, based on a first load requirement of a first tenant, a first bin having a fixed capacity for handing the first load requirement of the first tenant. In response to the first load requirement of the first tenant exceeding a first threshold of the fixed capacity of the first bin, packing a second bin allocated to handle a second load requirement of a second tenant. The second bin may be packed by transferring, to the second bin, the first load requirement of the first tenant based on the transfer not exceeding the first threshold of the fixed capacity of the second bin. In response to the transfer exceeding the first threshold of the fixed capacity of the second bin, allocating a third bin to handle the first load requirement of the first tenant.

20 Claims, 8 Drawing Sheets

DATA CURATION WITH CAPACITY SCALING

TECHNICAL FIELD

The subject matter described herein relates generally to data curation and more specifically to a data curation system with features for auto-scaling and self-healing.

BACKGROUND

A data lake is a type of data repository configured to store data in a natural or raw format such as, for example, files, binary large objects (BLOBs), and/or the like. Data stored in the data lake may be made available for a variety of applications including, for example, reporting, visualization, advanced analytics, and machine learning. For example, data from the data lake may be used to as training data for training one or more machine learning models to perform a variety of cognitive tasks such as object identification, natural language processing, information retrieval, and speech recognition. A deep learning model such as, for example, a neural network, may be trained to perform a classification task by at least assigning input samples to one or more categories. The deep learning model may be trained based on training data, which may include data from the data lake that has been labeled in accordance with the known category membership of each sample included in the training data. Alternatively and/or additionally, data from the data lake may be used to train the deep learning model to perform a regression task in which the deep learning model predicts, based at least on variations in one or more independent variables, corresponding changes in one or more dependent variables.

SUMMARY

Systems, methods, and articles of manufacture, including computer program products, are provided for capacity scaling. In some example embodiments, there is provided a system that includes at least one processor and at least one memory. The at least one memory may include program code that provides operations when executed by the at least one processor. The operations may include: allocating, based at least on a first load requirement of a first tenant, a first bin having a fixed capacity for handing the first load requirement of the first tenant; in response to the first load requirement of the first tenant exceeding a first threshold of the fixed capacity of the first bin, packing a second bin allocated to handle a second load requirement of a second tenant, the second bin being packed by at least transferring, to the second bin, the first load requirement of the first tenant based at least on the transfer not exceeding the first threshold of the fixed capacity of the second bin; and in response to the transfer exceeding the first threshold of the fixed capacity of the second bin, allocating a third bin to handle the first load requirement of the first tenant.

In some variations, one or more features disclosed herein including the following features can optionally be included in any feasible combination. In response to less than a second threshold of the fixed capacity of the first bin, the second bin, and/or the third bin being utilized, the first bin, the second bin, and/or the third bin may be deallocated.

In some variations, the fixed capacity may include a quantity of software resource and/or hardware resources capable of handling a fixed quantity of transactions and/or handling transactions at a fixed rate.

In some variations, the fixed quantity of transactions may include transactions to ingest data from an event stream providing a constant flow of data from a source system.

In some variations, the data ingested from the source system may be associated with one or more datatypes. The data ingested from the source system may further include a metadata defining a quantity and a content of fields forming each of the one or more datatypes.

In some variations, at least a portion of the data ingested from the source system may sent to a target system. The target system may perform, based at least on the data from the source system, a task including reporting, visualization, analytics, and/or machine learning.

In some variations, the fixed capacity may correspond to a maximum load requirement associated with the first tenant and/or the second tenant.

In some variations, the fixed capacity may correspond to a quality of service (QoS) associated with the first tenant and/or the second tenant.

In some variations, the first bin, the second bin, and/or the third bin may form a cluster of bins. Data may be routed to one of a plurality of bins forming the cluster based at least on a tenant associated with the data.

In some variations, one or more performance tests may be performed to verify the fixed capacity of the first bin, the second bin, and/or the third bin.

In another aspect, there is provided a method for capacity scaling. The method may include: allocating, based at least on a first load requirement of a first tenant, a first bin having a fixed capacity for handing the first load requirement of the first tenant; in response to the first load requirement of the first tenant exceeding a first threshold of the fixed capacity of the first bin, packing a second bin allocated to handle a second load requirement of a second tenant, the second bin being packed by at least transferring, to the second bin, the first load requirement of the first tenant based at least on the transfer not exceeding the first threshold of the fixed capacity of the second bin; and in response to the transfer exceeding the first threshold of the fixed capacity of the second bin, allocating a third bin to handle the first load requirement of the first tenant.

In some variations, one or more features disclosed herein including the following features can optionally be included in any feasible combination. In response to less than a second threshold of the fixed capacity of the first bin, the second bin, and/or the third bin being utilized, the first bin, the second bin, and/or the third bin may be deallocated.

In some variations, the fixed capacity may include a quantity of software resource and/or hardware resources capable of handling a fixed quantity of transactions and/or handling transactions at a fixed rate.

In some variations, the fixed quantity of transactions may include transactions to ingest data from an event stream providing a constant flow of data from a source system.

In some variations, the data ingested from the source system may be associated with one or more datatypes. The data ingested from the source system may further include a metadata defining a quantity and a content of fields forming each of the one or more datatypes.

In some variations, at least a portion of the data ingested from the source system may sent to a target system. The target system may perform, based at least on the data from the source system, a task including reporting, visualization, analytics, and/or machine learning.

In some variations, the fixed capacity may correspond to a maximum load requirement associated with the first tenant and/or the second tenant.

In some variations, the fixed capacity may correspond to a quality of service (QoS) associated with the first tenant and/or the second tenant.

In some variations, the first bin, the second bin, and/or the third bin may form a cluster of bins. Data may be routed to one of a plurality of bins forming the cluster based at least on a tenant associated with the data.

In another aspect, there is provided a computer program product including a non-transitory computer readable medium storing instructions. The instructions may cause operations may executed by at least one data processor. The operations may include: allocating, based at least on a first load requirement of a first tenant, a first bin having a fixed capacity for handing the first load requirement of the first tenant; in response to the first load requirement of the first tenant exceeding a first threshold of the fixed capacity of the first bin, packing a second bin allocated to handle a second load requirement of a second tenant, the second bin being packed by at least transferring, to the second bin, the first load requirement of the first tenant based at least on the transfer not exceeding the first threshold of the fixed capacity of the second bin; and in response to the transfer exceeding the first threshold of the fixed capacity of the second bin, allocating a third bin to handle the first load requirement of the first tenant.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1A:
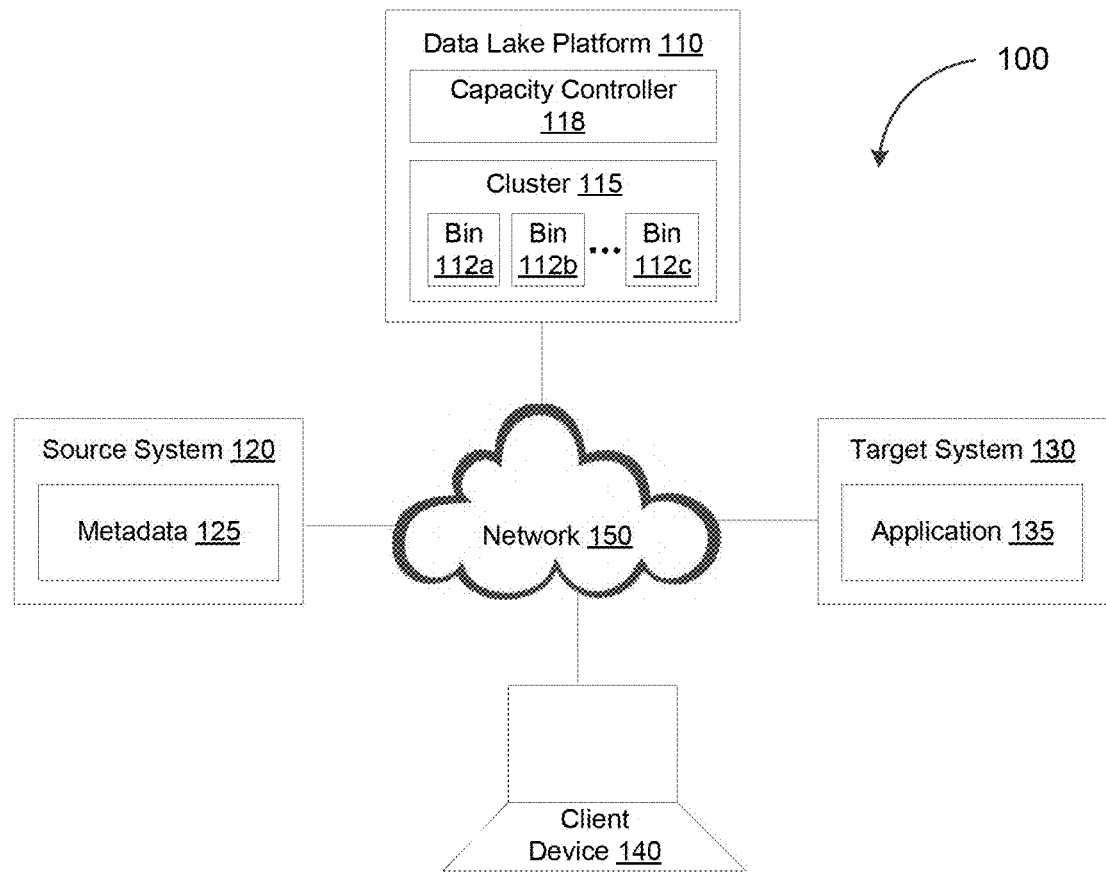
FIG. 1A depicts a system diagram illustrating an example of a data lake system, in accordance with some example embodiments.

Data stored in a data lake may be used for a variety of applications. For example, the data lake may ingest data from a source system before providing that data to a target system for a task such as reporting, visualization, advanced analytics, machine learning, and/or the like. The data lake may be configured with capacity to support multiple tenants, each of which imposing a different load requirement. For example, the data lake may have capacity to support a first tenant with a first load requirement (e.g., a first volume of transactions) and a second tenant with a second load requirement (e.g., a second volume of transactions). The first load requirement and the second load requirement being subject to change over time, thus necessitating a change in the capacity of the data lake. The capacity of the data lake may also require changes to accommodate the onboarding and/or off-boarding of one or more tenants. Nevertheless, adjusting the capacity of a conventional data lake may be a complicated process, which prevents the capacity of the data lake from scaling and self-healing when the load requirements of its tenants change.

In some example embodiments, a data lake platform may be configured to support auto-scaling and self-healing by allocating capacity in one or more processing units. For example, capacity at the data lake platform may be allocated in one or more "bins," each of which being a unit of a processing pipeline having a fixed quantity of capacity. A single bin may thus include a quantity of software resources and/or hardware resources capable of handling a fixed quantity of transactions. Examples of transactions may include transactions to ingest data from one or more source systems through an event stream having one or more corresponding topics. When allocating capacity in terms of bins, it should be appreciated that a single bin of capacity may be capable of accommodating the load requirement of multiple tenants. For instance, the data lake platform may allocate one bin of capacity to accommodate the first load requirement of the first tenant and the second load requirement of the second tenant. Alternatively and/or additionally, multiple bins of capacity may be necessary to satisfy the load requirement of a single tenant.

In some example embodiments, the capacity of the data lake platform may be scaled by allocating (or deallocating) one or more bins of capacity. The dynamic allocation (and deallocation) of capacity in fixed quantities may render the process less complex and more efficient, thus allowing the data lake platform to self-heal and address capacity shortfalls (or surpluses) with minimal downtime and intervention. For example, in response to the first load requirement of the first tenant exceeding a first bin allocated to the first tenant, the data lake platform may allocate a second bin to the first tenant. Alternatively and/or additionally, the data lake platform may deallocate the first bin if the first load requirement of the first tenant decreases and the second bin is sufficient to satisfy the first load requirement. To maximize resource utilization, the data lake platform may "pack" the second bin with a maximum quantity of tenants if, for example, the second bin is capable of accommodating the first load requirement of the first tenant and the second load requirement of the second tenant.

FIG. 1A depicts a system diagram illustrating an example of a data lake system 100, in accordance with some example embodiments. Referring to FIG. 1A, the data lake system 100 may include a data lake platform 110 including a capacity controller 118, a source system 120, a target system 130, and a client device 140. The data lake platform 110, the source system 120, the target system 130, and the client device 140 may be communicatively coupled via a network 150. The client device 140 may be a processor-based device including, for example, a smartphone, a tablet computer, a wearable apparatus, a virtual assistant, an Internet-of-Things (IoT) appliance, and/or the like. The network 150 may be any wired network and/or a wireless network including, for example, a wide area network (WAN), a local area network (LAN), a virtual local area network (VLAN), a public land mobile network (PLMN), the Internet, and/or the like.

The data lake platform 110 may ingest data from the source system 120 and provide the data to the target system 130 for an application 135. The application 135 may be associated with one or more tasks such as, for example, reporting, visualization, advanced analytics, machine learning, and/or the like. At least a portion of the data from the source system 120 may be structured data organized in accordance with a data schema. The data schema may include, for example, a metadata 125 defining one or more datatypes including by specifying the quantity and contents of the fields forming each datatype. The metadata 125 may further specify the various relationship that may exist between different datatypes. As such, in addition to the data from the source system 120, the metadata 125 corresponding to the data schema of the source system 120 may also be shared with the target system 130 in order for the target system 130 to perform the one or more tasks associated with the application 135. The metadata 125 may be associated with a variety of formats including, for example, JavaScript Object Notation (JSON), Extensible Markup Language (XML), and/or the like. Accordingly, the data schema of the source system 120 may be shared with the target system 130 by at least sending, to the target system 130, one or more documents containing the metadata 125, for example, in a JavaScript Object Notation (JSON) format, an Extensible Markup Language (XML) format, and/or the like.

Figure 1B:
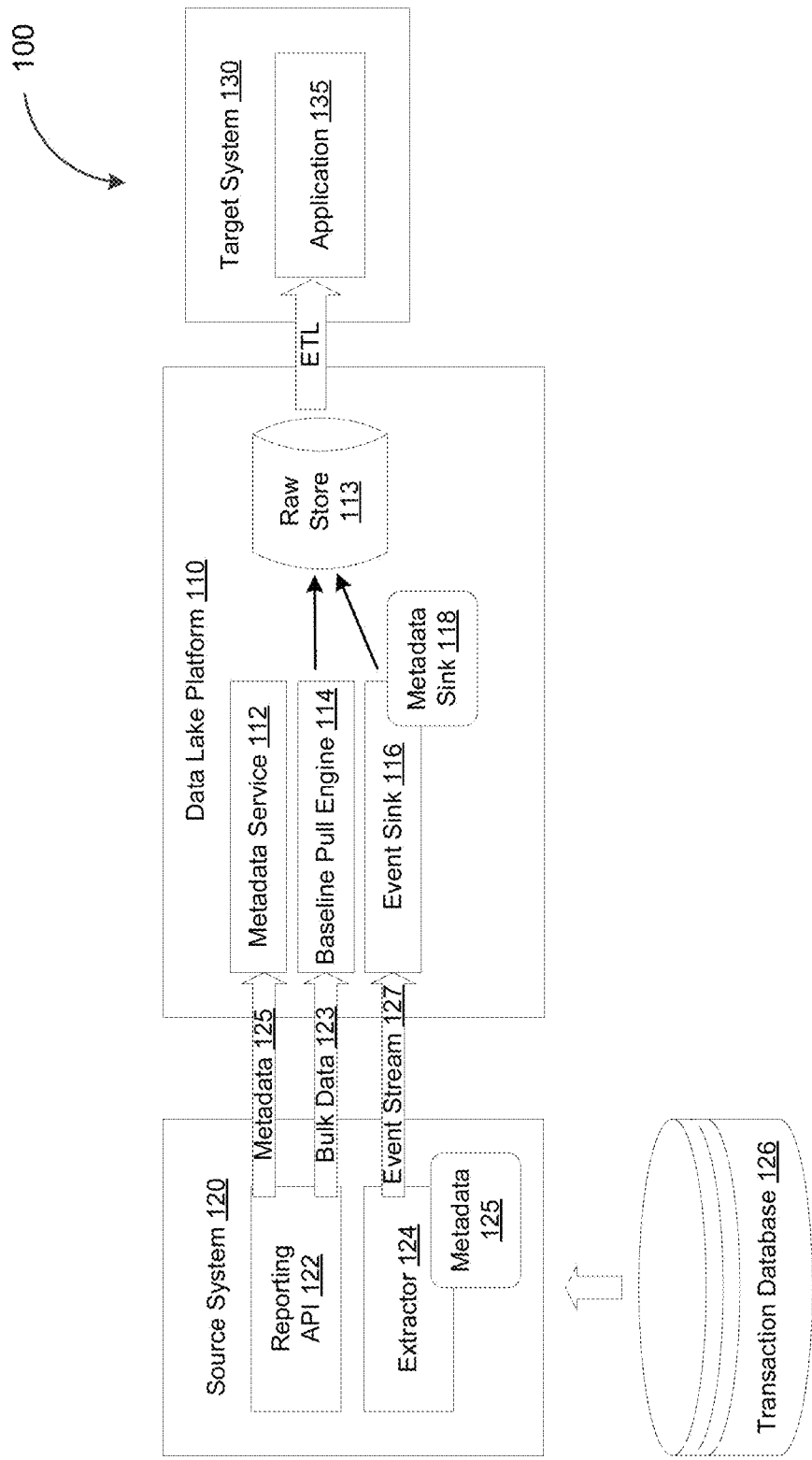
FIG. 1B depicts a schematic diagram illustrating an example of a data lake system, in accordance with some example embodiments.

FIG. 1B depicts a schematic diagram illustrating an example of the data lake system 100, in accordance with some example embodiments. Referring to FIGS. 1A-B, the source system 120 may include a reporting application programming interface (API) 122 configured to send the metadata 125 to a metadata service 112 at the data lake platform 110 and a bulk data 123 to a baseline pull engine 114 at the data lake platform 110. Furthermore, the source system 120 may include an extractor 124 configured to send the metadata 125 to an event sink 116 at the data platform 110. The data lake platform 110 may include a raw store 113 configured to store raw data from the baseline pull engine 114 and the event sink 116. As shown in FIG. 1B, at least a portion of the raw data from the raw store 113 may undergo an extract, transform, and load (ETL) process in order to be used by the application 135 at the target system 130.

The source system 120 and the target system 130 may be associated with one or more tenants of the data lake platform 110. For example, the source system 120 and the target system 130 may be associated with the same tenant or different tenants. Interactions with the source system 120 and the target system 130 may give rise to transactions that consume the capacity of the data lake platform 110. For instance, the data lake platform 110 may perform one or more transactions as part of the ingestion of data from an event stream 127 associated with the source system 120 including the draining of packets associated with each topic included in the event stream 127. The event stream 127 may hold streaming data (or a constant flow of data) that is processed in real time as it is delivered to the target system 130. Accordingly, the data lake platform 110 may be configured with capacity to support the transactions associated with the source system 120, the target system 130, and/or the corresponding tenants.

In some example embodiments, the capacity controller 118 may be configured to adjust the capacity of the data lake platform 110. For example, capacity at the data lake platform 110 may be allocated in one or more bins 112, each of which being a unit of a processing pipeline having a fixed quantity of capacity. A single bin 112 may thus include a quantity of software resources and/or hardware resources capable of handling a fixed quantity of transactions such as the transactions arising from the ingestion of data from the source system 120. In some cases, the capacity of each bin 112 may correspond to a maximum load requirement of one or more existing tenants. Alternatively and/or additionally, the capacity of each bin 112 may correspond to a maximum load requirement expected at the data lake platform 110. It should be appreciated that load requirement may, in some cases, correspond to the quality of service (QoS) associated with a specific tenant and/or the data lake platform 110 as a whole. Thus, the load requirement may include a quantity of transactions as well as the rate at which the transactions are processed at the data lake platform 110.

As shown in FIG. 1A, one or more bins may for a cluster of bins such as a cluster 115, which may include a first bin 112a, a second bin 112b, and a third bin 112c. It should be appreciated that depending on the load requirement imposed by various tenants of the data lake platform 110, the data lake platform 110 may include a different quantity of clusters 115, each of which containing one or more of the bins 112.

When more than a threshold quantity (e.g., an x-percent and/or the like) of the capacity of the first bin 112a is allocated to a tenant and/or occupied by existing tasks, the capacity controller 118 may automatically scale the capacity of the data lake platform 110 in order to meet the load requirement. This scaling may include allocating one or more additional bins such as the second bin 112b and/or the third bin 112c. The capacity controller 118 may also adjust the capacity of the data lake platform 110 by deallocating an existing bin, such as the second bin 112b and/or the third bin 112c, if less than a threshold quantity (e.g., a y-percent and/or the like) of the capacity of each bin is allocated to a tenant and/or occupied by existing tasks. This automatic scaling of capacity may enable the data lake platform 110 to respond to changes in load requirements with minimal intervention and downtime, thus achieving an ability to self-heal from capacity shortfalls and surpluses.

In some example embodiments, fixing the capacity of the bin 112 may maximize the performance reliability of the data lake platform 110 in production. For example, the capacity of the software resources and/or hardware sources forming the bin 112 may be configured and verified during testing. As such, the quantity of bins that are allocated during production may be determined based on the load requirements (or expected load requirements) of the various tenants of the data lake platform 110. The size of the bin 112 may be computed based on Equations (1) and (2) below. According to Equations (1) and (2), the size of the bin 112 may be configured to support a certain throughput such as a multiple N of the maximum (or peak) load requirement expected at the data lake platform 110. This maximum (or peak) load requirement may be determined based at least on a historical data associated with a particular tenant. The size of the bin 112 may therefore correspond to a quantity of resources (e.g., the quantity of partitions, executors, and/or the like) required to achieve the throughput.

$$\text{bin throughput} = N \times \text{maximum throughput} \quad (1)$$

$$\text{bin size} = \text{quantity of resources to achieve bin throughput} \quad (2)$$

Meanwhile, the size of the cluster 115, which may correspond to the quantity of bins included in the cluster 115, may be computed based on Equation (3) below. According to Equation (3), the quantity of bins included in the cluster 115 may correspond to the total throughput expected at the data lake platform 110. Moreover, the quantity of bins included in the cluster 115 may correspond to the capacity of the buffer as adjusted by the throughput of each bin 112.

$$\text{cluster size} = \text{quantity of bins} = \text{total throughput} + \frac{\text{buffer capacity}}{\text{bin throughput}}$$

Figure 2A:
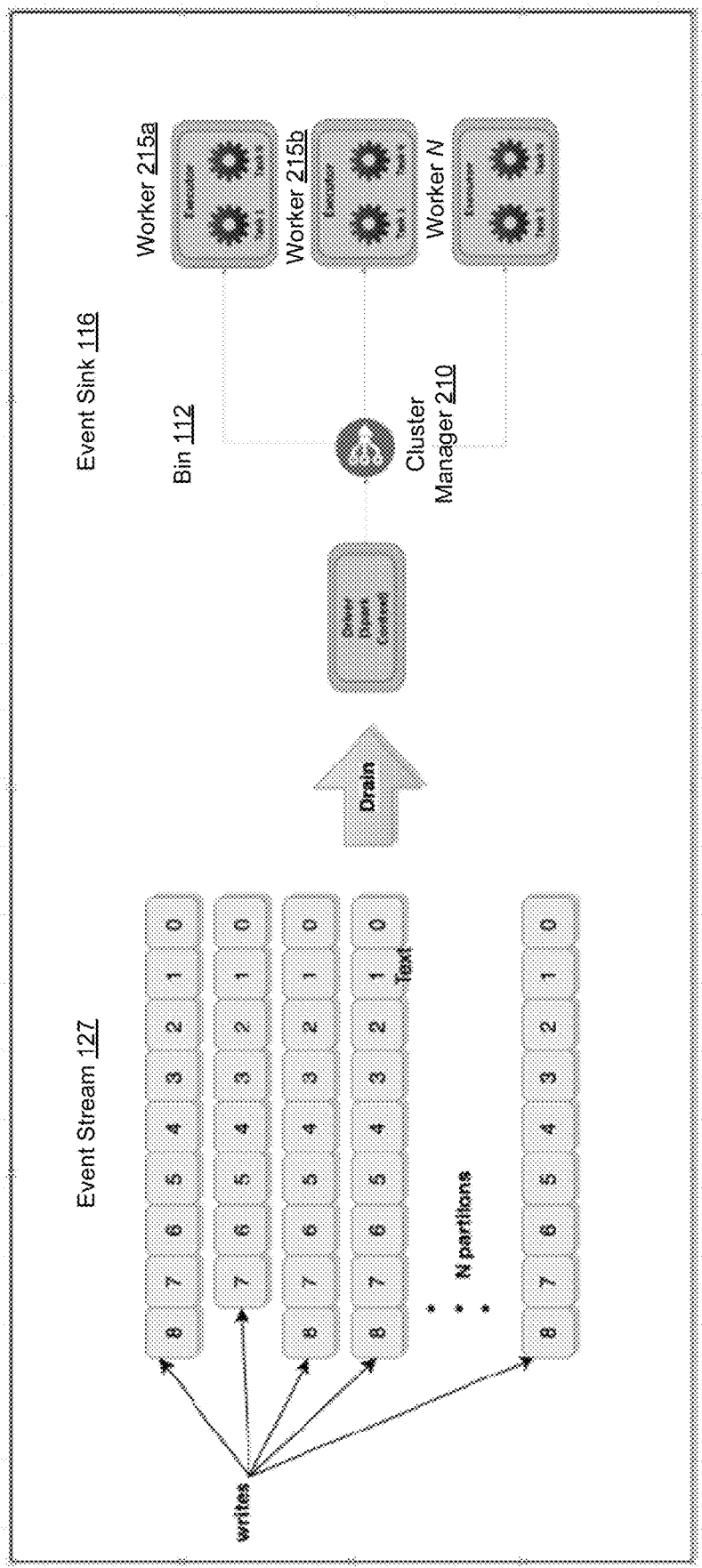
FIG. 2A depicts a schematic diagram illustrating an example of a bin, in accordance with some example embodiments.

FIG. 2A depicts a schematic diagram illustrating an example of the bin 112, in accordance with some example embodiments. Referring to FIG. 2A, the bin 112 may be allocated to ingest data from the event stream 127, which may correspond to a single topic having an N quantity of partitions. Data from the source system 120, including the metadata 125, may be written to the N quantity of partitions in the event stream 127 before being drained to the event sink 116. The bin 112 may include sufficient capacity, including software resources and/or hardware resources, to process the data drained to the event sink 116. For example, in the example of the bin 112 shown in FIG. 2A, the bin 112 may include a cluster manager 210 coordinating the operations of an N quantity of worker nodes including, for example, a first worker node 215a, a second worker node 215b, and/or the like. Each of the N quantity of worker nodes may include an executor performing one or more tasks associated with the ingestion of data from the event stream 127.

Figure 2B:
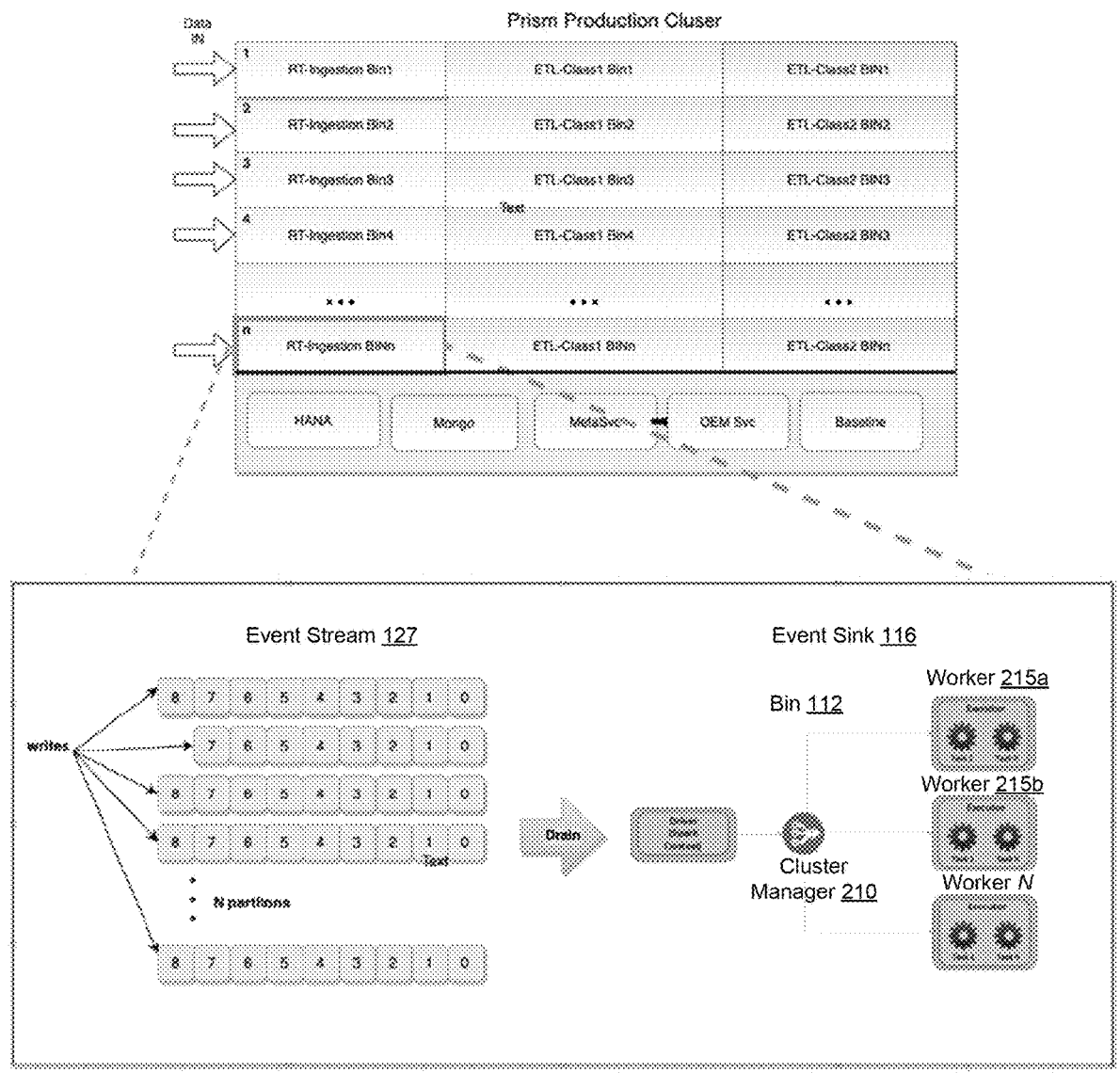
FIG. 2B depicts a schematic diagram illustrating an example of a production cluster, in accordance with some example embodiments.

FIG. 2B depicts a schematic diagram illustrating an example of the cluster 115, in accordance with some example embodiments. Referring to FIGS. 2A-B, the cluster 115 may include one or more bins including, for example, the bin 112. In the example of the cluster 115 shown in FIG. 2B, bins may be allocated to perform various tasks associated with transferring data from the source system 120 to the target system 130 including, for example, ingestion, extraction, transformation, and loading. Incoming data from the source system 120 may be routed to one or more of the bins in the cluster 115, such as the bin 112, based on the partition (e.g., realm and/or the like) at the source system 120 from which the data originates. As used herein, a single partition at the source system 120, such a realm and/or the like, may be associated with a tenant and a single tenant may be associated with one or more partitions. Table 1 below depicts an example of an algorithm for routing data to a bin in the cluster 115. As shown in Table 1, data may be routed to a bin within the cluster 115 based at least on the tenant associated with the data.

TABLE 1

RealRouting = {
BIN1 = {realm1, realm4, realm10, realm20},
BIN2 = {realm5, realm6, realm2, realm5, realm17, realm19}
BIN3 = {realm7, ... ,realmx)
.
.
.
BINN = {realmx, realmy, reamlz, ... }
}

In some example embodiments, the capacity controller 118 may be configured to pack the bin 112 such that the second bin 112b is not allocated unless a threshold quantity (e.g., an x-percent and/or the like) of the capacity of the first bin 112a is allocated to a tenant and/or occupied by existing tasks. The capacity controller 118 may also deallocate the second bin 112b and/or the third bin 112c if less than a threshold quantity (e.g., a y-percent and/or the like) of the capacity of each bin is allocated to a tenant and/or occupied by existing tasks. The remaining tasks associated with the deallocated bins, such as the second bin 112b and/or the third bin 112c, may be routed to another bin such as, for example, the first bin 112a. Thus, it should be appreciated that depending on the load requirement of each tenant, a single tenant may require multiple bins while a single bin may be capable of supporting transactions from multiple tenants (or partitions such as realms). Automatically scaling capacity may, as noted, enable the data lake platform 110 to respond to changes in load requirements with minimal intervention and downtime, thus achieving an ability to self-heal from capacity shortfalls and surpluses.

Figure 3A:
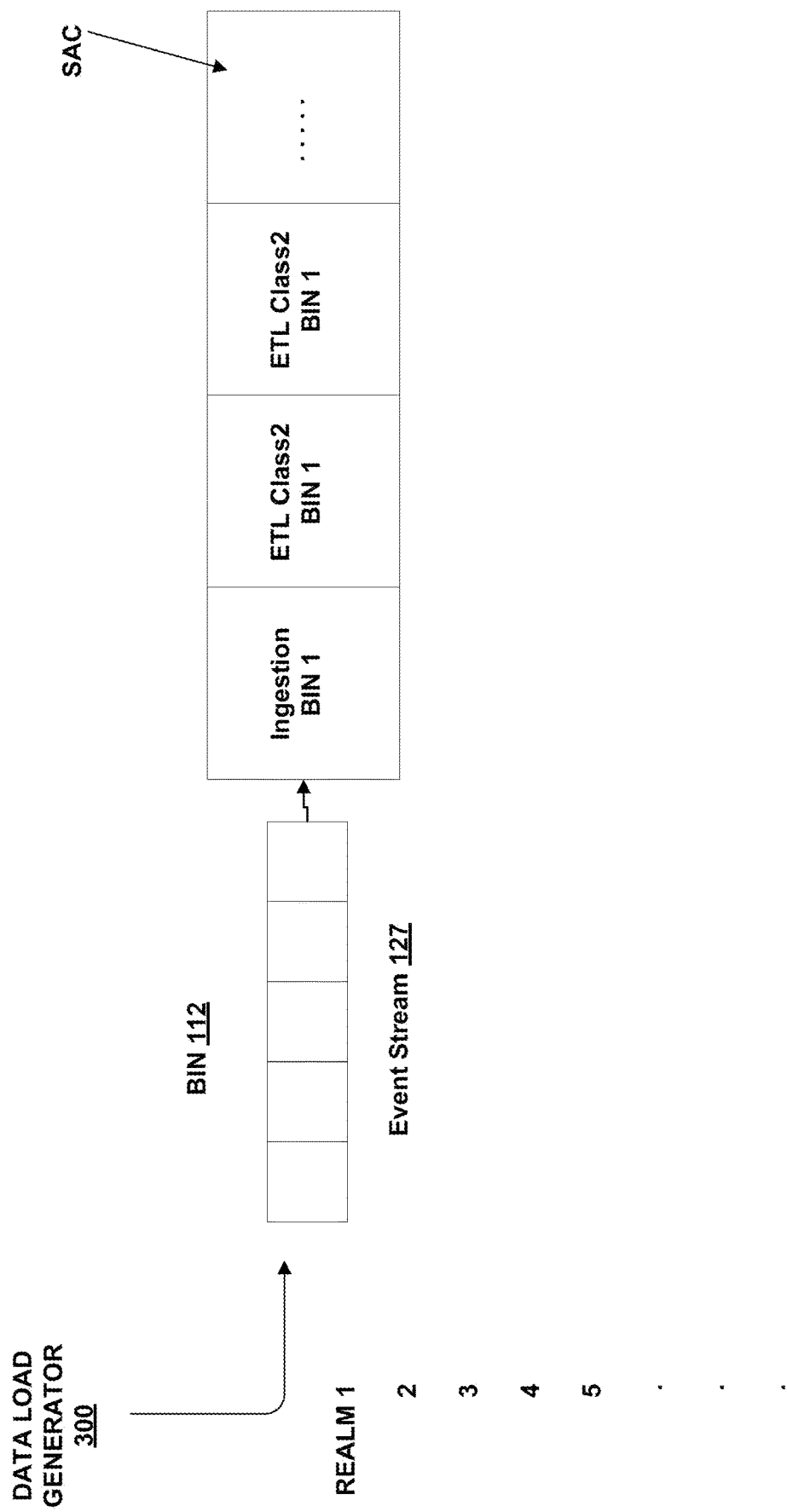
FIG. 3A depicts a schematic diagram illustrating an example of a performance test, in accordance with some example embodiments.
Figure 3B:
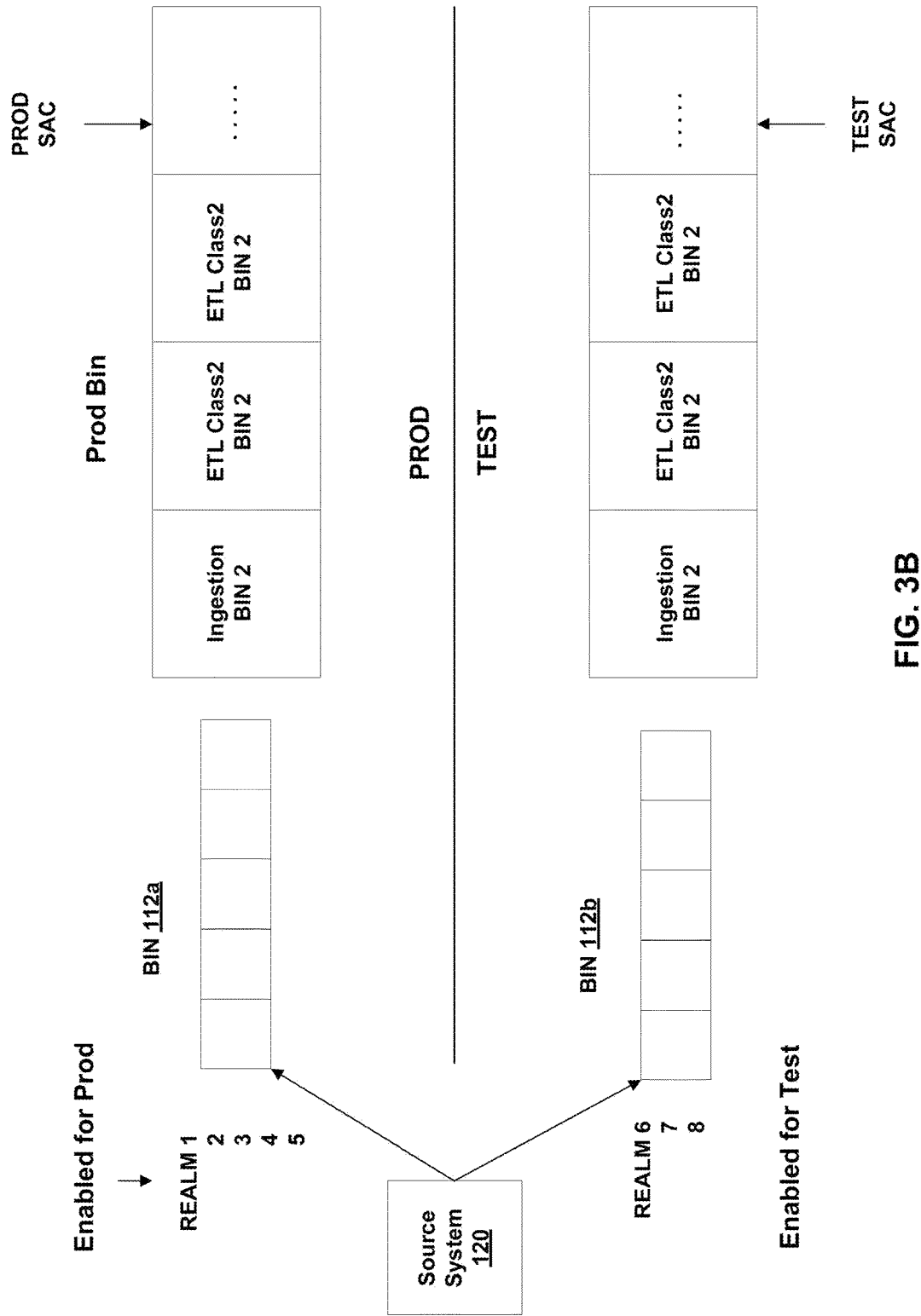
FIG. 3B depicts a schematic diagram illustrating another example of a performance test, in accordance with some example embodiments.

In some example embodiments, allocating capacity in fixed sized bins, such as the bin 112, may simplify the testing required to ascertain an ability of the data lake platform 110 to handle a current load requirement and to scale to meet future changes in load requirement. FIG. 3A depicts a schematic diagram illustrating an example of a performance test, in accordance with some example embodiments. The performance test may be performed in order to verify the capacity of the bin 112 including the quantity of transactions that the software resources and/or hardware resources included in the bin 112 is capable of handling. As shown in FIG. 3A, the performance test may be performed, for example, by filling the event stream 127 using data from a load generator 300. Alternatively and/or additionally, the capacity of the bin 112 may also be verified in production, for example, with production live testing. FIG. 3B depicts a schematic diagram illustrating an example of a production live testing, which may be performed on actual data from the source system 120.

Figure 4:
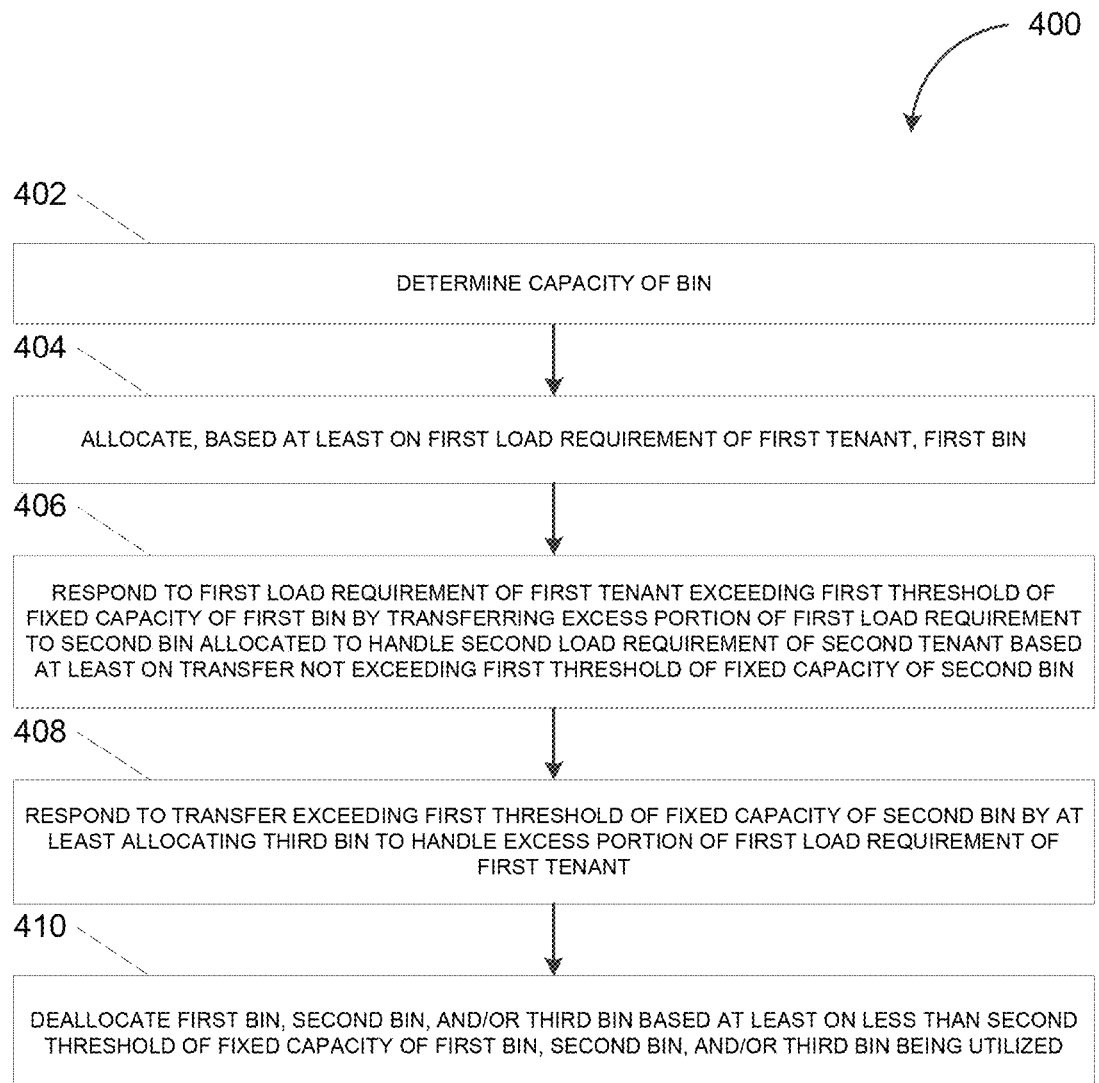
FIG. 4 depicts a flowchart illustrating an example of a process for scaling the capacity of a data lake platform, in accordance with some example embodiments.

FIG. 4 depicts a flowchart illustrating an example of a process 400 for scaling the capacity of the data lake platform 110, in accordance with some example embodiments. Referring to FIGS. 1A-B, 2A-B, 3A-B, and 4, the process 400 may be performed by the capacity controller 118 in order to adjust the capacity of the data lake platform 110 by allocating and/or deallocating one of more fixed sized bins such as the bin 112.

At 402, the capacity controller 118 may determine a capacity of a bin. In some example embodiments, the capacity of a bin, such as the bin 112, may include a fixed quantity of software resources and/or hardware resources capable of handling a certain quantity of transactions at the data lake platform 110. For example, the capacity of each bin 112 may correspond to a maximum load requirement of one or more existing tenants of the data lake platform 110. Alternatively and/or additionally, the capacity of each bin 112 may correspond to a maximum load requirement expected at the data lake platform 110. The load requirement may correspond to the quality of service (QoS) associated with a specific tenant and/or the data lake platform 110 as a whole. Accordingly, the load requirement may include a quantity of transactions as well as the rate at which the transactions are processed at the data lake platform 110. Thus, in some cases, the capacity of the bin 112 may include a quantity of software resources and/or hardware resources capable of handling a certain quantity of transactions at a threshold rate corresponding to the quality of service (QoS) of a specific tenant and/or the data lake platform 110 as a whole.

At 404, the capacity controller 118 may allocate, based at least on a first load requirement of a first tenant, a first bin. For example, the capacity controller 118 may allocate, to a first tenant of the data lake platform 110, the first bin 112a. The first bin 112a may be allocated based at least on the first load requirement of the first tenant.

At 406, the capacity controller 118 may respond to the first load requirement of the first tenant exceeding a first threshold of a first capacity of the first bin by at least transferring an excess portion of the first load requirement to a second bin allocated to handle a second load requirement of a second tenant based at least on the transfer not exceeding the first threshold of the fixed capacity of the second bin. In some example embodiments, the capacity controller 118 may maximize resource utilization at the data lake platform 110 by packing one or more of the bins at the data lake platform 110. For example, the capacity controller 118 may pack the second bin 112b with a maximum quantity of tenants if the second bin 112b is capable of accommodating the load requirements of multiple tenants. Moreover, in some cases, upon deallocating the first bin 112a for underutilization, the capacity controller 118 may transfer the first load requirement of the first tenant to the second bin 112b if the second bin 112b is capable of accommodating the first load requirement of the first tenant, for example, along with the second load requirement of the second tenant.

At 408, the capacity controller 118 may allocate a third bin to handle the excess portion of the first load requirement of the first tenant based at least on the transfer exceeding the first threshold of the fixed capacity of the second bin. In some example embodiments, the capacity controller 118 may automatically scale the capacity of the data lake platform 110 by at least allocating additional bins when more than a threshold quantity (e.g., an x-percent and/or the like) of the capacity of the first bin 112a is consumed by the first load requirement of the first tenant. For example, the capacity controller 118 may allocate the second bin 112b to support the first load requirement of the first tenant if the first load requirement of the first tenant exceeds more than the threshold quantity of the capacity of the first bin 112a.

At 410, the capacity controller 118 may respond to less than a second threshold of the fixed capacity of the first bin, the second bin, and/or the third bin being utilized by at least deallocating the first bin, the second bin, and/or the third bin. In some example embodiments, automatic capacity scaling may further include the capacity controller 118 deallocating underused bins having less than a threshold quantity (e.g., a y-percent and/or the like) of capacity being allocated to a tenant and/or occupied by existing tasks. For example, if the first load requirement of the first tenant consumes less than the threshold quantity of the first capacity of the first bin 112a, the capacity controller 118 may deallocate the first bin 112a. Furthermore, the capacity controller 118 may transfer the first load requirement of the first bin 112a to another bin such as, for example, the second bin 112b, the third bin 112c, and/or the like.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: allocating, based at least on a first load requirement of a first tenant, a first bin having a fixed capacity for handing the first load requirement of the first tenant; in response to the first load requirement of the first tenant exceeding a first threshold of the fixed capacity of the first bin, packing a second bin allocated to handle a second load requirement of a second tenant, the second bin being packed by at least transferring, to the second bin, the first load requirement of the first tenant based at least on the transfer not exceeding the first threshold of the fixed capacity of the second bin; and in response to the transfer exceeding the first threshold of the fixed capacity of the second bin, allocating a third bin to handle the first load requirement of the first tenant.

Example 2: The system of example 1, further comprising: in response to less than a second threshold of the fixed capacity of the first bin, the second bin, and/or the third bin being utilized, deallocating the first bin, the second bin, and/or the third bin.

Example 3: The system of any one of examples 1 to 2, wherein the fixed capacity comprises a quantity of software resource and/or hardware resources capable of handling a fixed quantity of transactions and/or handling transactions at a fixed rate.

Example 4: The system of example 3, wherein the fixed quantity of transactions comprises transactions to ingest data from an event stream providing a constant flow of data from a source system.

Example 5: The system of example 4, wherein the data ingested from the source system is associated with one or more datatypes, and wherein the data ingested from the source system further includes a metadata defining a quantity and a content of fields forming each of the one or more datatypes.

Example 6: The system of any one of examples 4 to 5, further comprising: sending, to a target system, at least a portion of the data ingested from the source system, the target system performing, based at least on the data from the source system, a task including reporting, visualization, analytics, and/or machine learning.

Example 7: The system of any one of examples 1 to 6, wherein the fixed capacity corresponds to a maximum load requirement associated with the first tenant and/or the second tenant.

Example 8: The system of any one of examples 1 to 7, wherein the fixed capacity corresponds to a quality of service (QoS) associated with the first tenant and/or the second tenant.

Example 9: The system of any one of examples 1 to 8, wherein the first bin, the second bin, and/or the third bin form a cluster of bins, and wherein data is routed to one of a plurality of bins forming the cluster based at least on a tenant associated with the data.

Example 10: The system of any one of examples 1 to 9, further comprising: performing one or more performance tests to verify the fixed capacity of the first bin, the second bin, and/or the third bin.

Example 11: A computer-implemented method, comprising: allocating, based at least on a first load requirement of a first tenant, a first bin having a fixed capacity for handing the first load requirement of the first tenant; in response to the first load requirement of the first tenant exceeding a first threshold of the fixed capacity of the first bin, packing a second bin allocated to handle a second load requirement of a second tenant, the second bin being packed by at least transferring, to the second bin, the first load requirement of the first tenant based at least on the transfer not exceeding the first threshold of the fixed capacity of the second bin; and in response to the transfer exceeding the first threshold of the fixed capacity of the second bin, allocating a third bin to handle the first load requirement of the first tenant.

Example 12: The method of example 11, further comprising: in response to less than a second threshold of the fixed capacity of the first bin, the second bin, and/or the third bin being utilized, deallocating the first bin, the second bin, and/or the third bin.

Example 13: The method of any one of examples 11 to 12, wherein the fixed capacity comprises a quantity of software resource and/or hardware resources capable of handling a fixed quantity of transactions and/or handling transactions at a fixed rate.

Example 14: The method of example 13, wherein the fixed quantity of transactions comprises transactions to ingest data from an event stream providing a constant flow of data from a source system.

Example 15: The method of example 14, wherein the data ingested from the source system is associated with one or more datatypes, and wherein the data ingested from the source system further includes a metadata defining a quantity and a content of fields forming each of the one or more datatypes.

Example 16: The method of any one of examples 14 to 15, further comprising: sending, to a target system, at least a portion of the data ingested from the source system, the target system performing, based at least on the data from the source system, a task including reporting, visualization, analytics, and/or machine learning.

Example 17: The method of any one of examples 11 to 16, wherein the fixed capacity corresponds to a maximum load requirement associated with the first tenant and/or the second tenant.

Example 18: The method of any one of examples 11 to 17, wherein the fixed capacity corresponds to a quality of service (QoS) associated with the first tenant and/or the second tenant.

Example 19: The method of any one of examples 11 to 18, wherein the first bin, the second bin, and/or the third bin form a cluster of bins, and wherein data is routed to one of a plurality of bins forming the cluster based at least on a tenant associated with the data.

Example 20: A non-transitory computer readable medium storing instructions, which when executed by at least one data processor, result in operations comprising: allocating, based at least on a first load requirement of a first tenant, a first bin having a fixed capacity for handing the first load requirement of the first tenant; in response to the first load requirement of the first tenant exceeding a first threshold of the fixed capacity of the first bin, packing a second bin allocated to handle a second load requirement of a second tenant, the second bin being packed by at least transferring, to the second bin, the first load requirement of the first tenant based at least on the transfer not exceeding the first threshold of the fixed capacity of the second bin; and in response to the transfer exceeding the first threshold of the fixed capacity of the second bin, allocating a third bin to handle the first load requirement of the first tenant.

Figure 5:
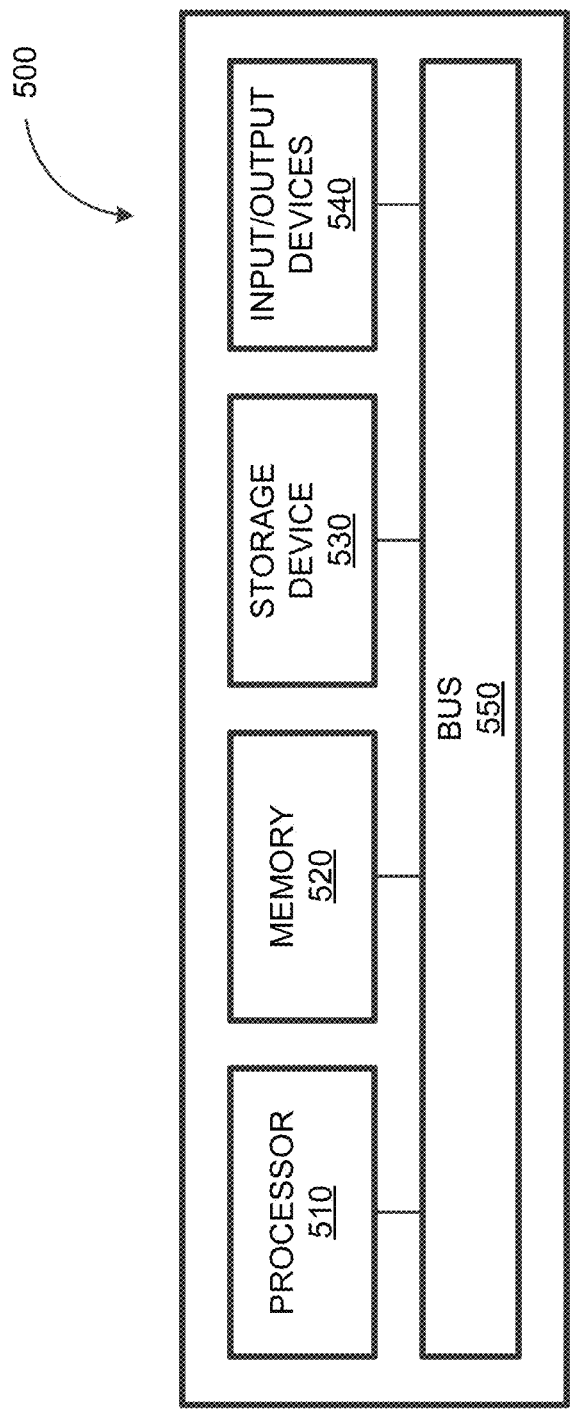
FIG. 5 depicts a block diagram illustrating a computing system, in accordance with some example embodiments; and When practical, similar reference numbers denote similar structures, features, or elements.

FIG. 5 depicts a block diagram illustrating a computing system 500, in accordance with some example embodiments. Referring to FIGS. 1A-B, 2A-B, 3A-B, and 4-5, the computing system 500 can be used to implement the capacity controller 118 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the capacity controller 118. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one processor; and
   at least one memory including program code which when executed by the at least one processor provides operations comprising:
   receiving, at a first bin comprised in a data lake platform, an event stream of data ingested from a source system;
   computing a bin throughput as a multiple of a maximum load requirement expected at the data lake platform;
   computing a size of a fixed capacity of the first bin as equal to a quantity of resources to achieve the bin throughput;
   allocating, by a capacity controller included in the data lake platform and based at least on a first load requirement of a first tenant, the first bin having the fixed capacity;
   in response to the first load requirement of the first tenant exceeding a first threshold of the fixed capacity of the first bin, packing, by the capacity controller, a second bin allocated to handle a second load requirement of a second tenant, the second bin packed by at least transferring, to the second bin, at least a portion of the first load requirement of the first tenant based at least on the transfer not exceeding the first threshold of the fixed capacity of the second bin, such that the second bin is allocated to at least the portion of the first load requirement associated with the first tenant and further allocated to the second load requirement of the second tenant's second event stream; and in response to the transfer exceeding the first threshold of the fixed capacity of the second bin, allocating, by the capacity controller, a third bin to handle the first load requirement of the first tenant.

2. The system of claim 1, wherein the data lake platform further comprises an event sink for receiving the event stream from the source system and a metadata service for receiving metadata associated with the data ingested from the source system, and further comprising:

in response to less than a second threshold of the fixed capacity of the first bin, the second bin, and/or the third bin being utilized, deallocating the first bin, the second bin, and/or the third bin.

3. The system of claim 1, wherein the fixed capacity comprises a quantity of software resources and/or hardware resources capable of handling a fixed quantity of transactions and/or handling transactions at a fixed rate.

4. The system of claim 3, wherein the fixed quantity of transactions comprises transactions to ingest data from the event stream providing a constant flow of data from the source system.

5. The system of claim 4, wherein the data ingested from the source system is associated with one or more datatypes, and wherein the data ingested from the source system further includes a metadata defining a quantity and a content of fields forming each of the one or more datatypes.

6. The system of claim 4, further comprising:

sending, to a target system, at least a portion of the data ingested from the source system, the target system performing, based at least on the data from the source system, a task including reporting, visualization, analytics, and/or machine learning.

7. The system of claim 1, wherein the fixed capacity corresponds to a maximum load requirement associated with the first tenant and/or the second tenant.

8. The system of claim 1, wherein the fixed capacity corresponds to a quality of service (QOS) associated with the first tenant and/or the second tenant.

9. The system of claim 1, wherein the first bin, the second bin, and/or the third bin form a cluster of bins, and wherein data is routed to one of a plurality of bins forming the cluster based at least on a tenant associated with the data.

10. The system of claim 1, further comprising:

performing one or more performance tests to verify the fixed capacity of the first bin, the second bin, and/or the third bin.

11. A computer-implemented method, comprising:

receiving, at a first bin comprised in a data lake platform, an event stream of data ingested from a source system;

computing a bin throughput as a multiple of a maximum load requirement expected at the data lake platform;

computing a size of a fixed capacity of the first bin as equal to a quantity of resources to achieve the bin throughput;

allocating, by a capacity controller included in the data lake platform and based at least on a first load requirement of a first tenant, the first bin having the fixed capacity;

in response to the first load requirement of the first tenant exceeding a first threshold of the fixed capacity of the first bin, packing, by the capacity controller, a second bin allocated to handle a second load requirement of a second tenant, the second bin packed by at least transferring, to the second bin, at least a portion of the first load requirement of the first tenant based at least on the transfer not exceeding the first threshold of the fixed capacity of the second bin, such that the second bin is allocated to at least the portion of the first load requirement associated with the first tenant and further allocated to the second load requirement of the second tenant's second event stream; and in response to the transfer exceeding the first threshold of the fixed capacity of the second bin, allocating, by the capacity controller, a third bin to handle the first load requirement of the first tenant.

12. The method of claim 11, wherein the data lake platform further comprises an event sink for receiving the event stream from the source system and a metadata service for receiving metadata associated with the data ingested from the source system, and further comprising:

in response to less than a second threshold of the fixed capacity of the first bin, the second bin, and/or the third bin being utilized, deallocating the first bin, the second bin, and/or the third bin.

13. The method of claim 11, wherein the fixed capacity comprises a quantity of software resources and/or hardware resources capable of handling a fixed quantity of transactions and/or handling transactions at a fixed rate.

14. The method of claim 13, wherein the fixed quantity of transactions comprises transactions to ingest data from the event stream providing a constant flow of data from the source system.

15. The method of claim 14, wherein the data ingested from the source system is associated with one or more datatypes, and wherein the data ingested from the source system further includes a metadata defining a quantity and a content of fields forming each of the one or more datatypes.

16. The method of claim 14, further comprising:

sending, to a target system, at least a portion of the data ingested from the source system, the target system performing, based at least on the data from the source system, a task including reporting, visualization, analytics, and/or machine learning.

17. The method of claim 11, wherein the fixed capacity corresponds to a maximum load requirement associated with the first tenant and/or the second tenant.

18. The method of claim 11, wherein the fixed capacity corresponds to a quality of service (QOS) associated with the first tenant and/or the second tenant.

19. The method of claim 11, wherein the first bin, the second bin, and/or the third bin form a cluster of bins, and wherein data is routed to one of a plurality of bins forming the cluster based at least on a tenant associated with the data.

20. A non-transitory computer readable medium storing instructions, which when executed by at least one data processor, result in operations comprising:

receiving, at a first bin comprised in a data lake platform, an event stream of data ingested from a source system;

computing a bin throughput as a multiple of a maximum load requirement expected at the data lake platform;

computing a size of a fixed capacity of the first bin as equal to a quantity of resources to achieve the bin throughput;

allocating, by a capacity controller included in the data lake platform and based at least on a first load requirement of a first tenant, the first bin having the fixed capacity;

in response to the first load requirement of the first tenant exceeding a first threshold of the fixed capacity of the first bin, packing, by the capacity controller, a second bin allocated to handle a second load requirement of a second tenant, the second bin packed by at least transferring, to the second bin, at least a portion of the first load requirement of the first tenant based at least on the transfer not exceeding the first threshold of the fixed capacity of the second bin, such that the second bin is allocated to at least the portion of the first load requirement associated with the first tenant and further allocated to the second load requirement of the second tenant's second event stream; and in response to the transfer exceeding the first threshold of the fixed capacity of the second bin, allocating, by the capacity controller, a third bin to handle the first load requirement of the first tenant.

\* \* \* \* \*